Oct. 27, 1942.    J. A. HERON    2,300,221
EXTRUSION OF METAL ARTICLES
Filed June 5, 1940    2 Sheets-Sheet 1
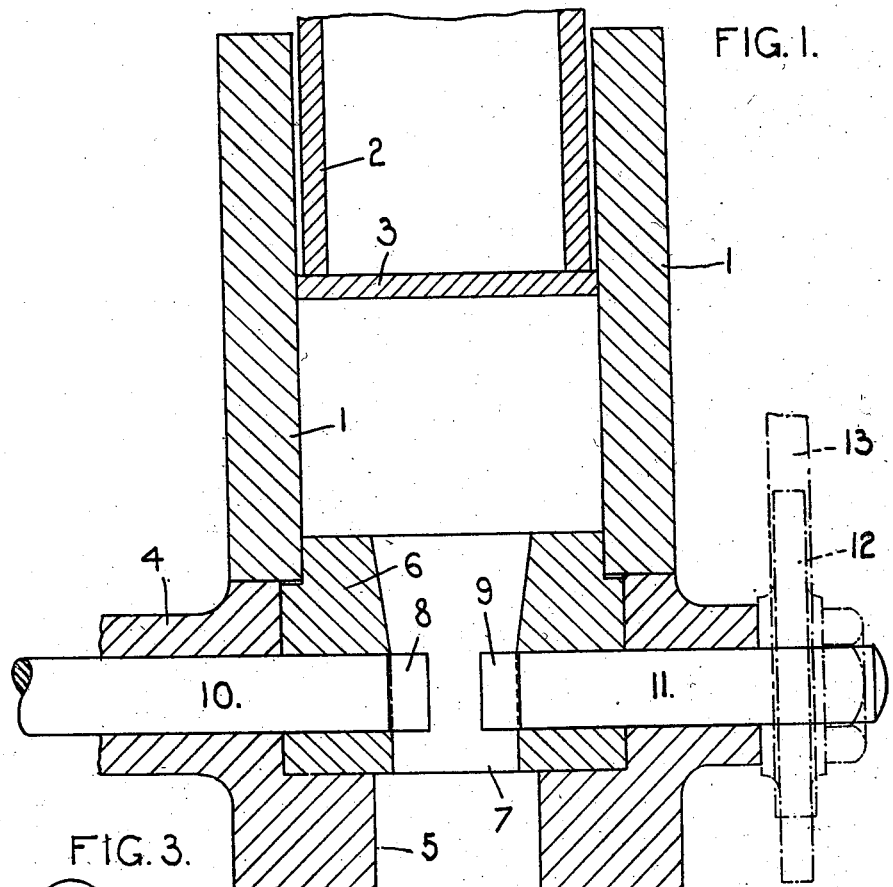
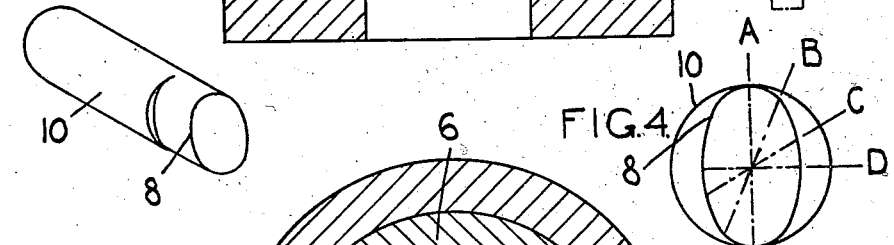
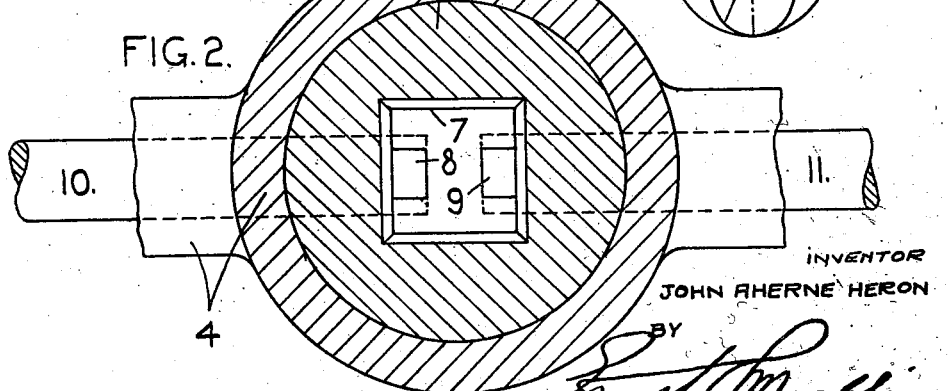
INVENTOR
JOHN AHERNE HERON Oct. 27, 1942.  J. A. HERON  2,300,221
EXTRUSION OF METAL ARTICLES
Filed June 5, 1940   2 Sheets-Sheet 2
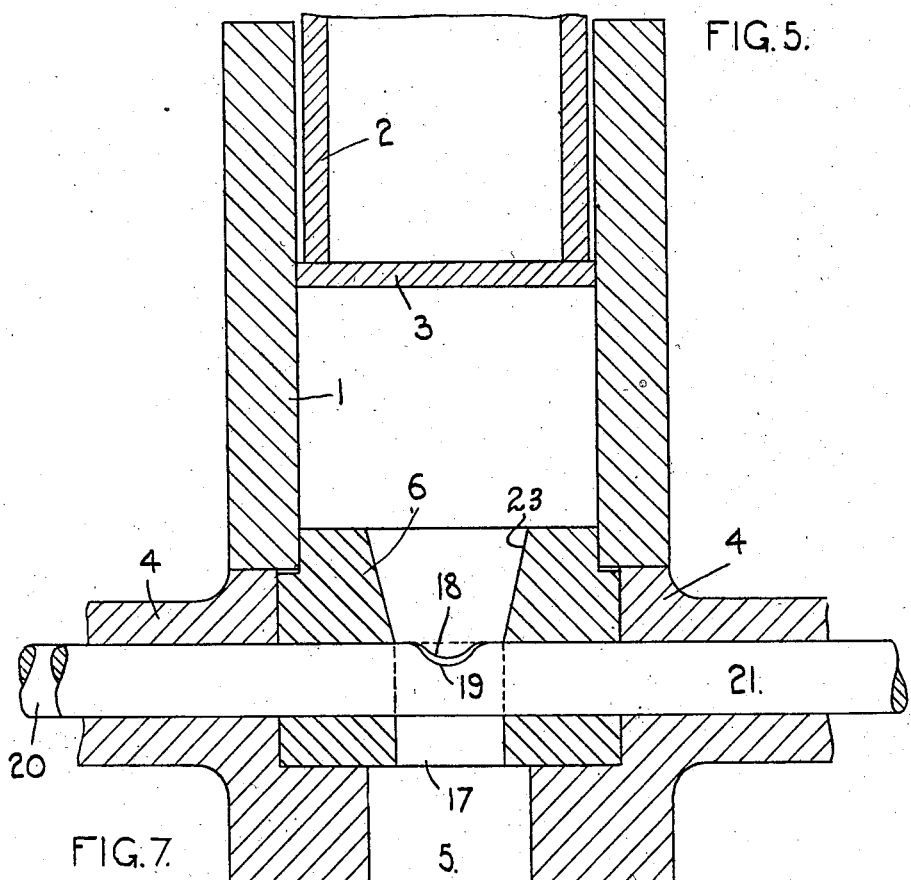
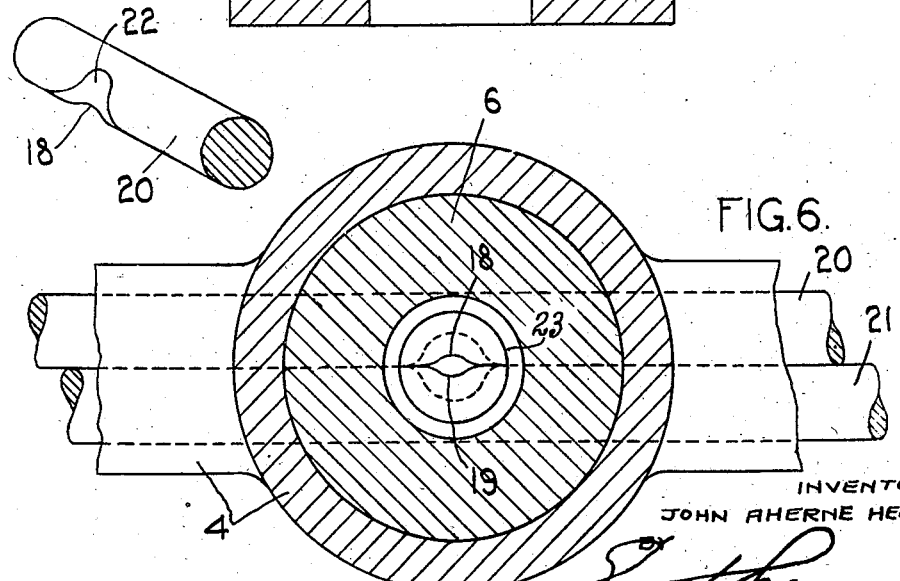
INVENTOR
JOHN AHERNE HERON
HIS ATTORNEY Patented Oct. 27, 1942

2,300,221

UNITED STATES PATENT OFFICE 2,300,221

EXTRUSION OF METAL ARTICLES

John Aherne Heron, Farnham Common, England, assignor to High Duty Alloys Limited, Slough, England Application June 5, 1940, Serial No. 339,011
In Great Britain April 14, 1939

6 Claims. (Cl. 207—18)

This invention relates to the extrusion of metal articles, more especially of light alloys such as those of aluminum and magnesium.

In the specification of co-pending application Serial No. 282,262, now Patent No. 2,231,336, granted Feb. 11, 1941, a method of extrusion is described wherein as extrusion proceeds the die is adapted to be modified or varied so as to impart a tapered or other required change in section to the extruded article, the particular means for effecting the die modification being sliding segments which are moved in consonance with the extruding ram to increase or decrease the section of the extrusion as requisite.

The present invention has for its object to provide improved means for varying the section of the extrusion which enables the desirable changes to be made not only in the dimension of the section extruded but, if need be also, in the nature of the section itself.

Further and favourable objects will appear from the following description.

In accordance with the present invention a variable die for extrusion presses includes a turnable member or members having variable profiles projecting into the die orifice such that as they are oscillated or rotated during the process of extrusion the effective section or dimension of the said orifice is varied and a variable section is imparted to the extruded article.

Sliding segments such as described in the aforementioned co-pending application may be associated with the turnable, that is rotatable or oscillatory, die members or segments according to the present invention or as will be understood the rotatable members may themselves be axially movable, for instance, they may be screw or worm fed in an axial direction to reduce the section of the die aperture as they are rotated to vary such section.

In the production of a variable H-section suitable for the main spar of aircraft wings the extrusion die is formed with an aperture coinciding with the major overall dimensions of the section required or with the perimeter of such major section and diametrically opposite rotatable members having elliptical cam or eccentric extensions projecting within the die aperture, so that as these members are rotated in consonance with the ram movement during extrusion, the profiles of the projections into the die aperture vary with consequential variation in the form of the channels at each face of the H-section.

Simultaneously, variation may be imparted to the external surfaces of the walls and thus also to the wall thickness, diametrically opposite movable segments located in quadrature to the rotatable members or segments aforementioned being for instance arranged to approach each other as extrusion proceeds so as to impart a diminishing thickness to the side walls of the H-section.

The invention also enables an airscrew blade blank to be extruded substantially to shape since not only may the sections be increased or decreased as requisite, but the rotatable segments permit of the required helical twist being also imparted. In this case the movable members are advantageously located on axes disposed tangentially instead of radially and such members are profiled to give the desired changes both in the nature and area of the section as the extrusion proceeds from root to tip or vice versa although the former will generally be found more convenient owing to the reduced section of the tip.

The invention will be further described with reference to the accompanying explanatory drawings which illustrate diagrammatically and by way of example two embodiments of the invention applied to direct extrusion presses and in which:

Figs. 1–4 represent an embodiment having a die equipped with diametrically opposite rotatable segments, Fig. 1 being a vertical section, Fig. 2 a horizontal section, Figs. 3 and 4 being detail views of one form of segment.

Figs. 5, 6 and 7 are similar views of an alternative arrangement having rotatable segments disposed parallel to each other within the die orifice.

Referring now to the drawings but first more particularly to Figs. 1–4, 1 generally designates the container for the heated billet or bloom, 2 the ram having a pressure plate 3 and, at the lower end of the container 1, a bolster or die holder 4 having an aperture 5 through which extrusion takes place mounts the die 6.

For the production of H-section girders the die orifice 7 is conveniently rectangular conforming with the perimetral or overall dimensions of the section, and to form the channels in the section, diametrically opposed segments 8 and 9 project into the die orifice. The segments 8 and 9 constitute the termination of shafts 10 and 11 respectively which are rotatably borne in the die holder or bolster 4 and as more clearly shown in Figs. 3 and 4, the segments projecting within the die orifice 7 are of elliptical form, so that as the shafts 10 and 11 are rotated, the segments constitute a greater or smaller obstruction within the die orifice 7 and consequently increase or reduce the cross sectional area of the channels at each face of the H-section with resulting variation in the section itself.

By reference to Fig. 4 which shows the segment 8 to a larger scale, it will be noted that the obstruction is greatest at the major diameter A of the ellipse progressively diminishing as the segment is rotated so that the diameters B and C lie horizontally across the die orifice 7, and reaching a minimum when the minor diameter D is in this position.

For actuating the segments resort may be had to any appropriate mechanism and in Fig. 1 the shaft 11 of the segment 9 is shown diagrammatically as furnished with a pinion or gear wheel 12 with which engages a toothed rack 13 moving in consonance with the ram 2, so that the segment rotates uniformly in correspondence with the downward movement of the ram 2 as extrusion proceeds. As will be understood the segments 8 and 9 will normally be arranged to rotate in unison, although for asymmetric sections this is not essential. Moreover as aforementioned, variation may be imparted to the external surfaces of the section by means of laterally sliding segments projecting more or less into the die orifice 7 and arranged in quadrature to the rotating segments 8 and 9, thus also imparting a taper to the section as extrusion proceeds in the manner described in co-pending application Serial No. 282,262.

It will be appreciated that in the case of a simple channel section one of the segments 8 or 9 may be omitted, the remaining segment being proportionately larger, an extrusion or variable section being obtained by rotating such section as extrusion proceeds and a similar result being achieved for other simple sections.

Like reference characters denote like or equivalent parts in the embodiments shown in Figs. 5–7 where the diametrically opposite segments 8 and 9 are replaced by obstructing members 18 and 19 forming part of shafts 20 and 21 rotatably mounted in the bolster or die holder 4 parallel to each other.

In this arrangement the orifice 17 of the die 6 is circular being intended for the production of variable curviform sections and the obstructing members 18 and 19 are formed by notches 22 machine or otherwise generated in the cylindrical surface of the shafts 20 and 21 and so shaped that as the shafts 20 and 21 are rotated, the obstructing members 18 and 19 occupy a greater or lesser area of the circular die orifice 17 and thereby reduce or increase its effective area for the passage of the section being extruded.

As more clearly shown in Figs. 6 and 7, the obstructions 18 and 19 and notches 22 are shaped to impart a ribbed circular major cross section and a flattened quasi-elliptical minor section to the article extruded, and it will be understood that while as in the embodiments illustrated in Figs. 1–4 the segment-carrying shafts 20 and 21 may be arranged to rotate in unison, this is not necessarily the case, particularly where the section it is desired to extrude is asymmetric.

For instance the notches 22 and obstructing members or segments 18 and 19 may be so shaped as to impart an aero-foil section to the article extruded varying to the extent desired and, it may be, increasing in dimension at one stage of extrusion and reducing in cross sectional dimension at another. Moreover, owing to the facility afforded by the rotating segments of imparting variation to the nature of the section itself, the extruded article may have imparted to it a helical twist so as to render it suitable for use as an airscrew blade blank necessitating a minimum of subsequent treatment.

For the production of such an article, however, as aforementioned the rotating or oscillatory segments are advantageously located on axes disposed tangentially of the die orifice 7 and intersecting the latter, the segments being profiled to give the desired changes both in the nature and area of the section as the extrusion proceeds from root to tip or vice versa. Other variable sections may also be readily produced.

In the dies illustrated in both embodiments a converging wall 23 connects the container 1 with the cylindrical orifice portion, 7 in the case of the embodiment in Figs. 1–4 and 17 in the embodiment in Figs. 5–7, but other forms of die may be used providing it is firmly and securely seated in the die holder 4 or bolster.

It will be appreciated that the invention is applicable to the continuous production by extrusion of shaped articles of any appropriate or desired section, since the effect of the movable, rotatable or oscillatory die segments may be reversed one or more times during the full stroke of the ram, and further that such segments may be actuated mechanically, hydraulically or in other suitable manner.

By the present invention the production of shaped articles by extrusion is facilitated and the scope of such production greatly enhanced.

What I claim is:

1. In extrusion apparatus, the combination with a container for a heated billet, a die at the outlet from said container and a plunger for extruding the metal of the billet through the orifice of said die, of at least one turnable member having a variably profiled portion projecting into said die orifice from its periphery, and means for turning the said member during extrusion to vary the effective periphery of said die orifice and impart a variable section to the extruded article.

2. In extrusion apparatus, the combination with a container for a heated billet, a die at the outlet from said container and a plunger for extruding the metal of the billet through the orifice of said die, of a pair of turnable members each having a variably profiled portion projecting into said die orifice from its periphery, and means for turning the said members during extrusion to vary the effective periphery of said die orifice and impart a variable section to the extruded article.

3. Extrusion apparatus according to claim 1 wherein the die orifice corresponds to the major boundary shape of the section to be extruded and the profiled portion of the member projecting within such boundary defines the actual shape of the section.

4. Extrusion apparatus according to claim 2 wherein the die orifice corresponds to the major boundary shape of the section to be extruded and the profiled members projecting within such boundary define the actual shape of the section.

5. Extrusion apparatus according to claim 2 wherein the turnable members are disposed diametrically opposite to one another, and the means for turning such members operates in consonance with the movement of the plunger.

6. Extrusion apparatus according to claim 2 wherein the members extend transversely across the die orifice and are turnable about parallel axes, and the means for rotating said members operates in consonance with the movement of the plunger.

JOHN AHERNE HERON.